Oct. 17, 1944.　　　　R. D. SHAW　　　　2,360,520
ACTUATOR FOR TOOL HEADS
Filed Feb. 25, 1942　　　　2 Sheets-Sheet 1

INVENTOR
*R. D. Shaw*
BY *Joseph H. Schofield*
ATTORNEY

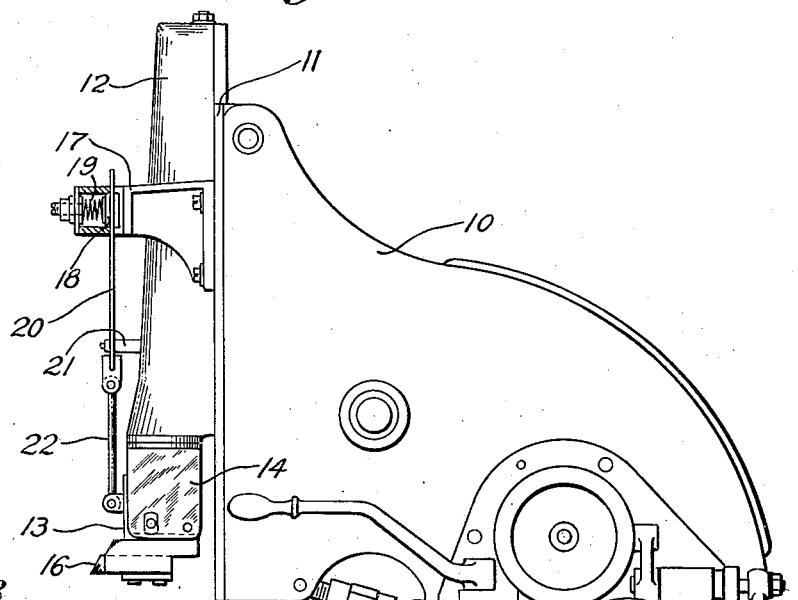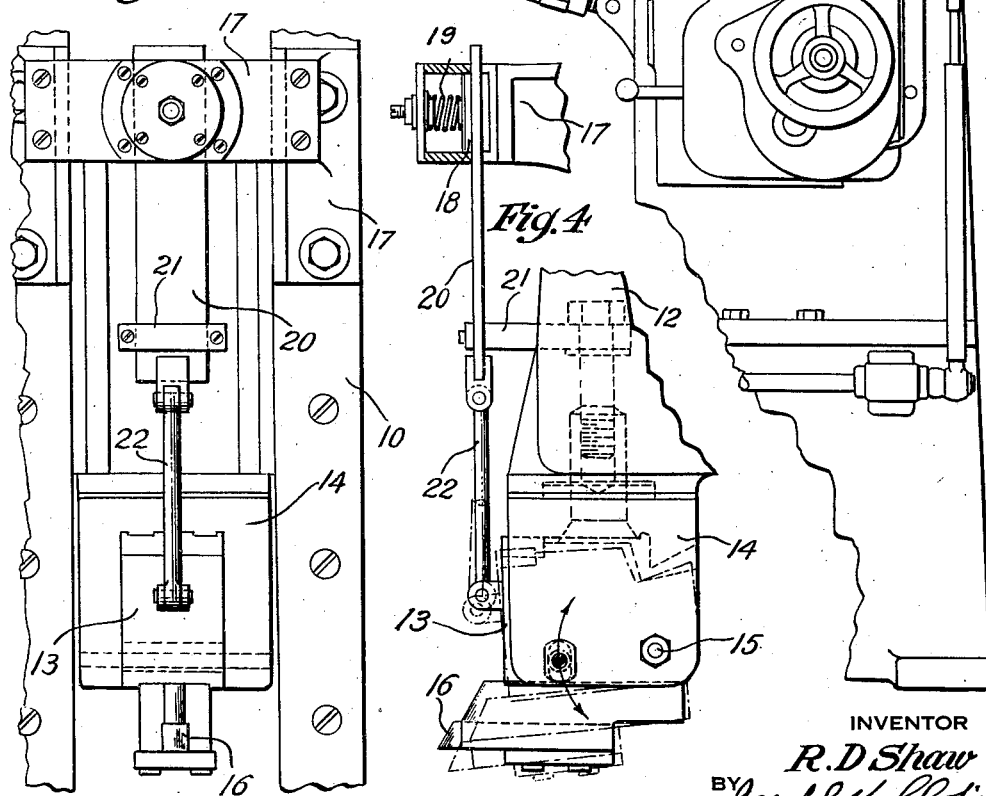

Patented Oct. 17, 1944

2,360,520

UNITED STATES PATENT OFFICE 2,360,520

ACTUATOR FOR TOOLHEADS

Robert D. Shaw, Bloomfield, Conn., assignor to Niles-Bement-Pond Company, West Hartford, Conn., a corporation of New Jersey Application February 25, 1942, Serial No. 432,171

2 Claims. (Cl. 90—55)

This invention relates to tool heads for machine tools and particularly to means for oscillating a tool head or clapper box into and out of operative position.

An object of the invention is to provide an improved means for effecting oscillatory movements of a tool head into and out of operative position during the cutting and return stroke respectively of a slide or ram on which the tool head is mounted.

A feature that enables the above object to be accomplished is that a member is connected to the tool head which has a portion thereof engaged by a fixed frictional retarding means mounted on the machine frame so that at each reversal of movement of the tool carrying slide the tool head will be oscillated to its opposite position.

With the above and other objects in view the invention may include the features of construction and operation set forth in the following specification and illustrated in the accompanying drawings.

In the accompanying drawings annexed hereto and forming a part of this specification, I have shown the invention embodied in a vertical shaping machine, but it will be understood that the invention can be otherwise embodied and that the drawings are not to be construed as defining or limiting the scope of the invention, the claims appended to this specification being relied upon for that purpose.

In the drawings:

Fig. 2 is a side elevation of portions of the machine shown in Fig. 1.

Fig. 3 is a front elevation of the tool head and its actuating mechanism shown upon an enlarged scale, and Fig. 4 is a side elevation of the parts shown in Fig. 3.

Figure 1:
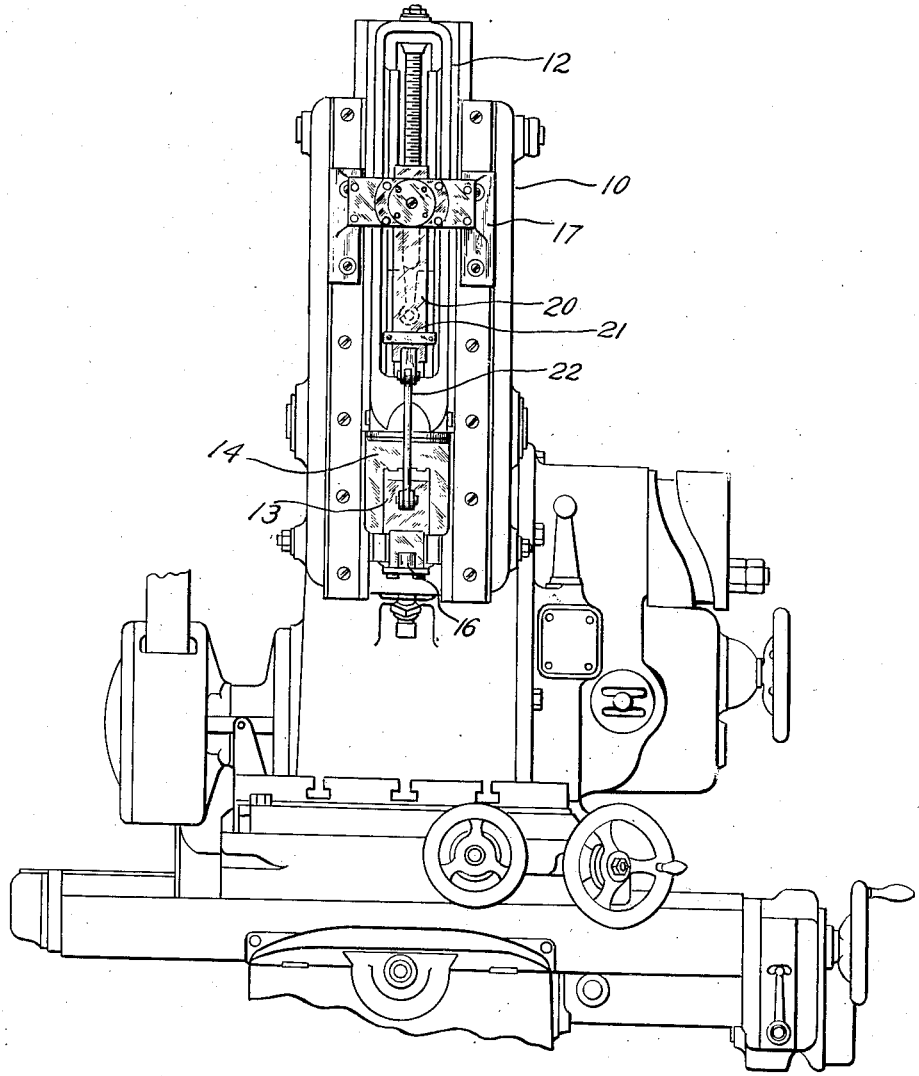
Figure 1 is a front elevation of a portion of a vertical shaper to which the present invention has been applied.

In the above mentioned drawings there has been shown but one embodiment of the invention which is now deemed preferable, but it is to be understood that changes and modifications may be made within the scope of the appended claims without departing from the spirit of the invention.

Briefly and in its broadest aspect the invention may include the following principal parts: first, a slide or ram mounted for vertical movement in suitable guideways provided in the frame member of a machine tool, the ram or slide having a pivotally mounted tool head mounted at one end; second, a bracket supported upon the frame member carrying the slide or ram and having an adjustable friction bearing plate mounted therein; and third, a bar or plate movable between the surfaces of said friction plates in the bracket connected at one end to a portion of the tool head at a distance from its pivot.

In the operation of machine tools such as planers, shapers and the like in which a tool is reciprocated relative to a work piece, it is necessary or desirable to oscillate the cutting tool into an inoperative or retracted position during the return movement of the work or tool and return the tool to its operating or cutting position during its forward or cutting stroke. The invention forming the subject matter of this application shows means for actuating the tool head provided on a movable ram or slide member so that at the beginning of the return movement of the member the tool will be immediately moved to its inoperative position and upon movement of the tool being reversed for the cutting stroke the tool immediately will be advanced to its operative position.

Referring more in detail to the figures of the drawings, there are shown portions of a vertical shaper having a column 10 provided with suitable vertical guideways 1 within which a tool carrying ram or slide 12 may operate. At the lower end of this ram or slide 12 is a tool head 13 housed within lateral portions of a block 14. The tool head 13 is pivotally mounted upon a cross pin 15 extending through the lateral portions of the block 14. When the tool head 13 is in the position shown in full lines in Fig. 4, the tool 16 will be in its operative position but when moved to the position shown in dot-and-dash lines of this figures the tool 16 will be in an inoperative or retracted position. Suitable means to limit the movement of the head are provided within the block 14.

In order to effect oscillatory movements of the tool head 13 within its block 14 upon reversal of the movement of the slide 12 there is mounted a bracket 17 or other form of support in fixed position upon the column 10 and preferably as shown extending around the ram 12. Within this bracket 17 is a bearing member or plate 18 spring pressed against a plane surface of the bracket forming an abutment. The pressure of spring 19 forcing the plate 18 toward its abutment is adjustable by any suitable means to vary the pressure of this plate against its abutment. Between the plate and abutment is disposed a flat bar-like member 20, the surfaces of which frictionally bear aganist the plate 18 and abutment in the bracket. This bar 20 may be guided near its lower end by a suitable support 21 mounted upon the ram 12 and is attached to the forward vertical surface of the tool head 13 by a suitable connecting rod 22.

The effect of this frictional means provided within the fixed bracket 17 is to retard the movement of the bar 20 at each reversal of movement of the slide 12. When the head 13 has oscillated to one or the other of its limiting positions, it will then be moved with the ram or slide. As soon as the ram or slide 12 starts downward, the friction is enough to prevent immediate movement of the bar 20 through the friction means and thus forces the slide to first oscillate the tool carrying head. As soon, however, as this head bears against its surfaces within the block 14 at the lower end of the slide 12, movement of the head 13 and the slide 12 continues. As soon as upward movement of the slide 12 is begun, the tool head 13 is oscillated by the bar 20 being retarded in its movement by the friction means until the tool head reaches its limited operative position after which the tool head and slide are elevated together. As the friction required to effect oscillation of the head 13 is not very great, the power loss due to this friction operating during the major portion of the strokes of the ram or slide is not serious.

What I claim is:

1. Oscillating means for tool heads comprising in combination, a machine slide having a pivotally mounted tool head therein, a frame member within which said slide operates to reciprocate said head, a bar connected at one end to said head and movable with said slide, a plate-like member at the opposite end of said bar, and means mounted on the frame member and frictionally engaging said plate-like member to retard movement of said bar until oscillation of said head has been effected upon reversal of movement of the slide.

2. A tool head oscillating means for machine tools comprising in combination, a machine slide having a pivotally mounted tool head therein, a frame member within which said slide operates, a bar connected at one end to said head for relative movement thereto, said bar being reciprocated with said slide and head, a plate-like member mounted at the opposite end of said bar, and fixed frictional means bearing against said plate-like member, whereby upon each reversal of movement of said slide initial movement thereof oscillates said tool head from one limited position to another.

ROBERT D. SHAW.